Figure 1:
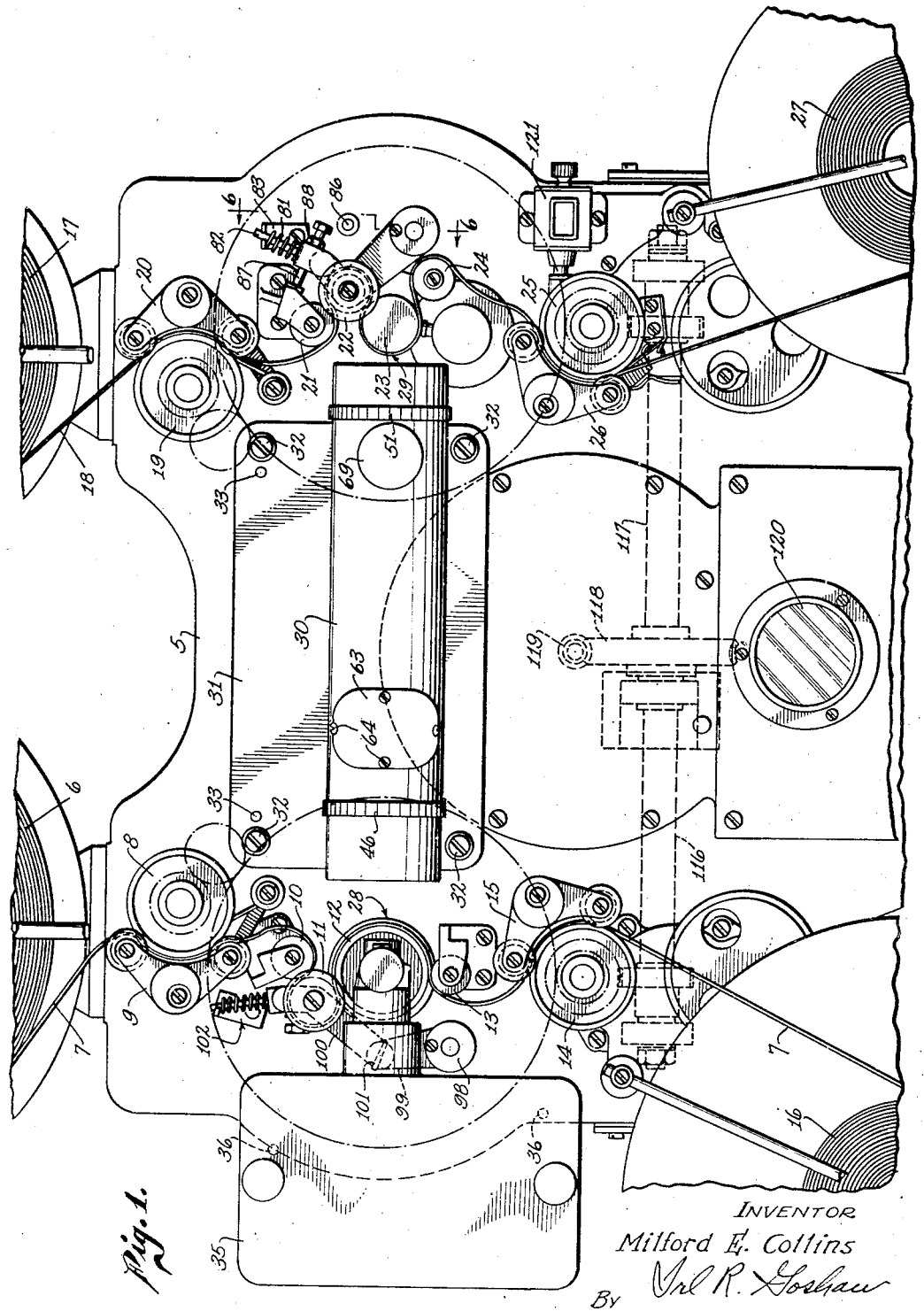

March 26, 1940.  M. E. COLLINS  2,194,542
OPTICAL REDUCTION PRINTER
Filed July 30, 1937  4 Sheets-Sheet 2

INVENTOR
Milford E. Collins
By
ATTORNEY

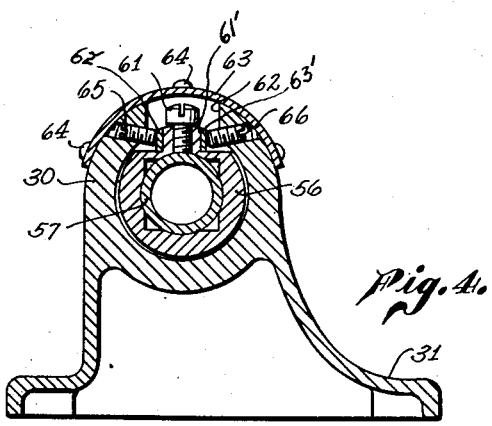
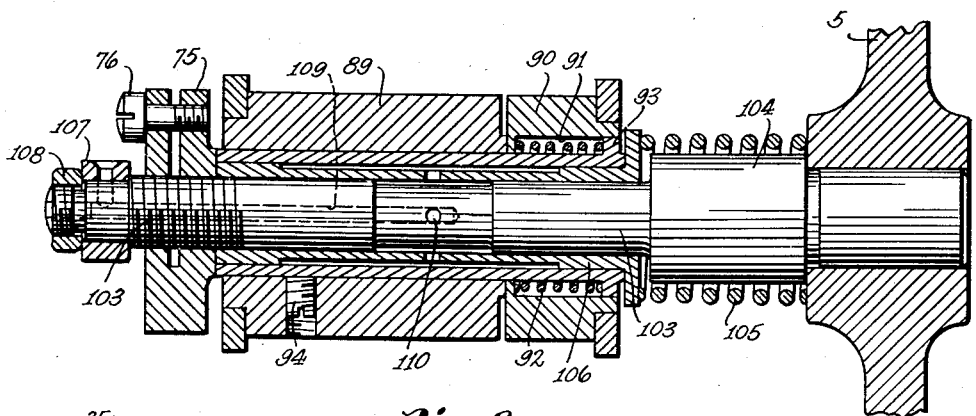
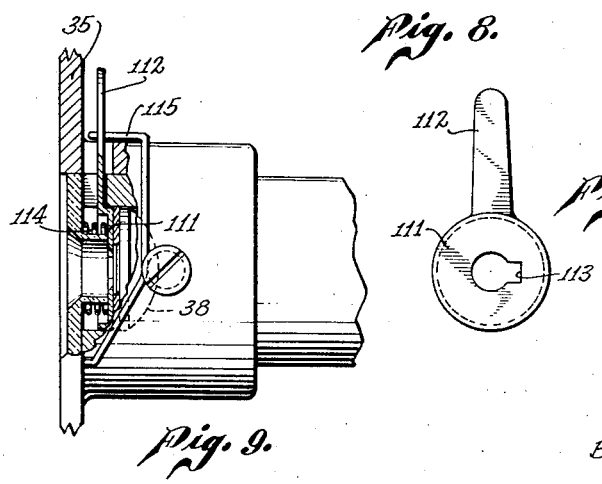
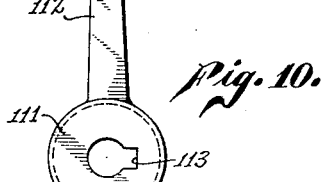

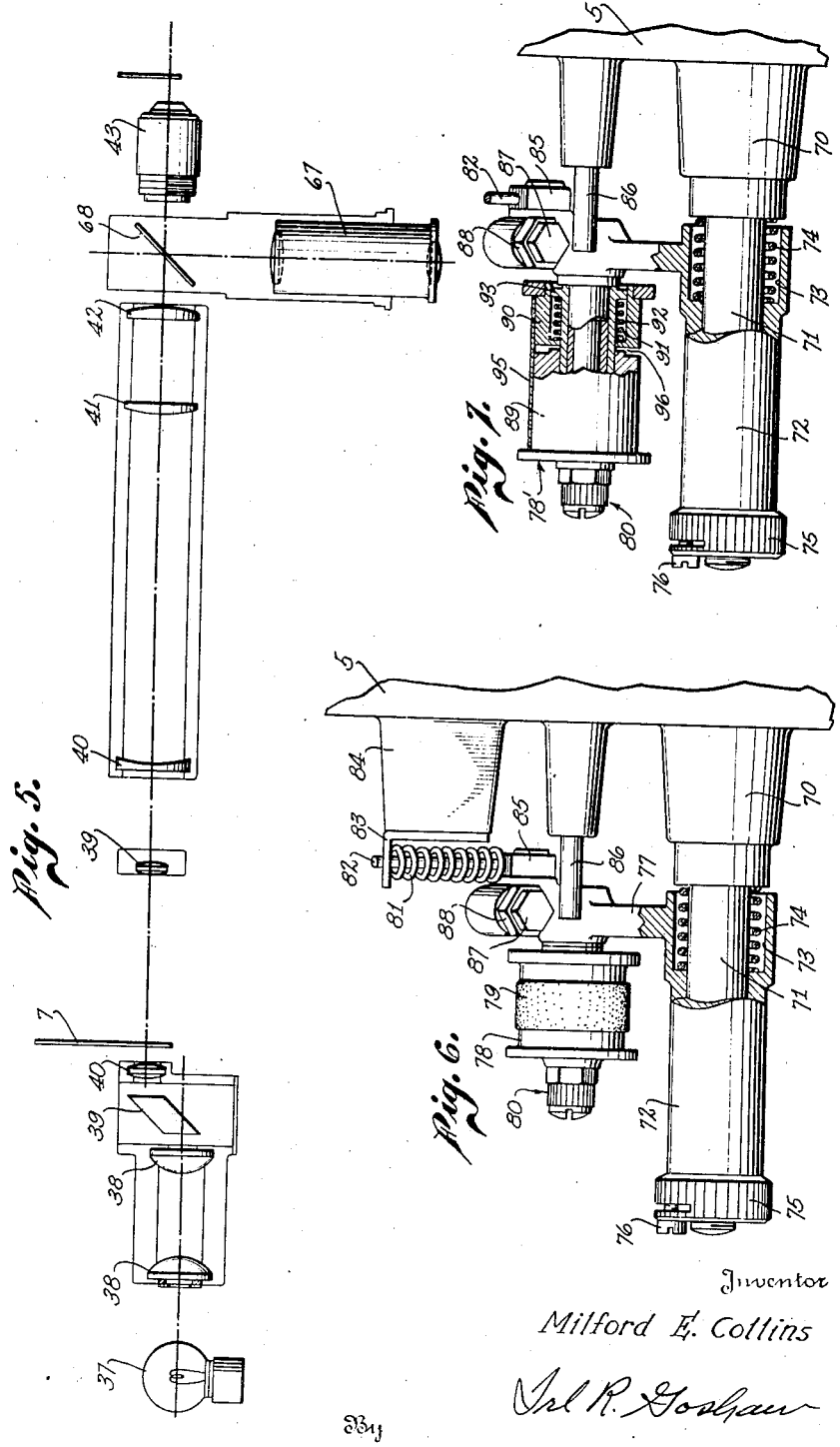

Patented Mar. 26, 1940

2,194,542

UNITED STATES PATENT OFFICE 2,194,542

OPTICAL REDUCTION PRINTER

Milford E. Collins, Hollywood, Calif., assignor to Radio Corporation of America, a corporation of Delaware Application July 30, 1937, Serial No. 156,506

8 Claims. (Cl. 88—24)

This invention relates to motion picture apparatus and particularly to motion picture film printers wherein the image on the printing film is optically projected to a film being printed, the projected image being either of the same dimensions as the original or of different dimensions from the original image.

The printing of the sound track on motion picture film, particularly when the dimensions thereof are varied during the printing process, requires accurate positioning of all the vital elements such as the light source, films, reflectors, and lenses. In the manufacture of motion picture film printing apparatus, therefore, it is desirable that all possible fixed adjustments between cooperating elements be made at the factory or assembling plant where the necessary equipment and engineering skill are present. Particularly is this true of the optical portion of this apparatus involving the light source and lenses which project the light beam to the negative and from negative to positive. Adjustment of these lenses is generally critical as in the case of an anamorphosing system wherein sound is being printed to small dimensions or to dimensions having different proportions than those of the original sound track. In such a system there are delicate adjustments required such as, for instance, the proper orientation of the azimuths of the non-spherical lenses and the proper focusing for position and size of the light source upon the surface of the negative film, and of the modulated beam upon the surface of the positive film. By providing an arrangement whereby such optical adjustments are made under the supervision and control of the manufacturer of the apparatus, a more satisfactory printer is obtained since this critical portion of the apparatus has been adjusted under optimum conditions.

It is to be understood that wherever the term "negative" is used it always refers to the film carrying the image being printed, while the term "positive" refers to the film upon which the image is projected.

In many printers and particularly in the present invention the negative and positive films are wrapped over drums, which definitely fixes the surfaces of the films at the translation points. However, not only do films vary in width, but the position of the sound track transversely of the film quite frequently varies for different films. This is usually caused by the use of different recording machines or different adjustments of the same machines. It is desirable, therefore, that the printer be provided with simple and efficient means for adjusting the film sidewise or transversely of its length. The present invention provides a printer construction having the optical portion of the apparatus as complete assembled units which mount on the printer in fixed positions, and the film guide portions of the apparatus readily adjustable to quickly and efficiently place the films at their corrected lateral positions with respect to the light beam or beams.

An object of the invention, therefore, is to more efficiently obtain the optimum printing conditions for motion picture film.

Another object of the invention is to facilitate the transverse adjustment of negative and positive films on a motion picture film printing apparatus during operation thereof.

A further object of the invention is to provide a printer having fixed optical portions and adjustable film guide portions.

Figure 2:
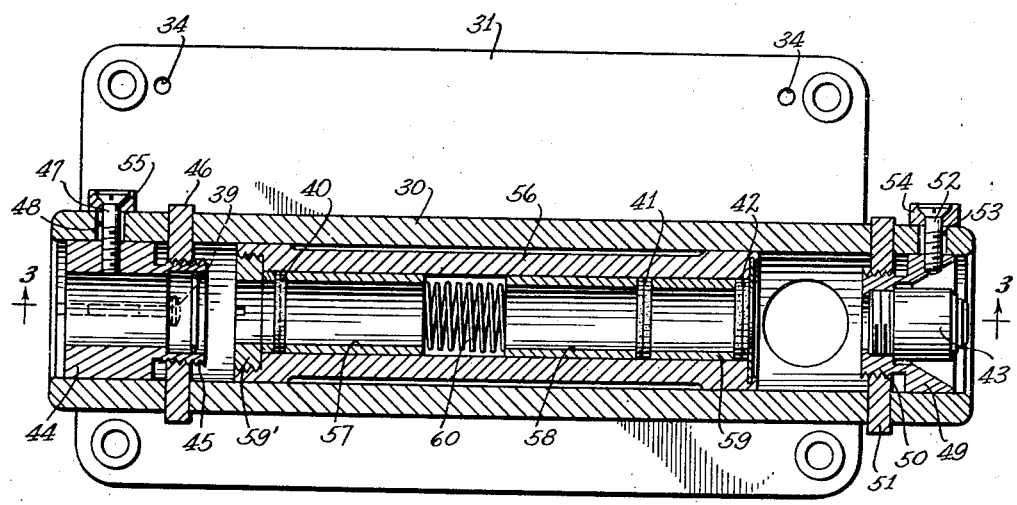
Figure 3:
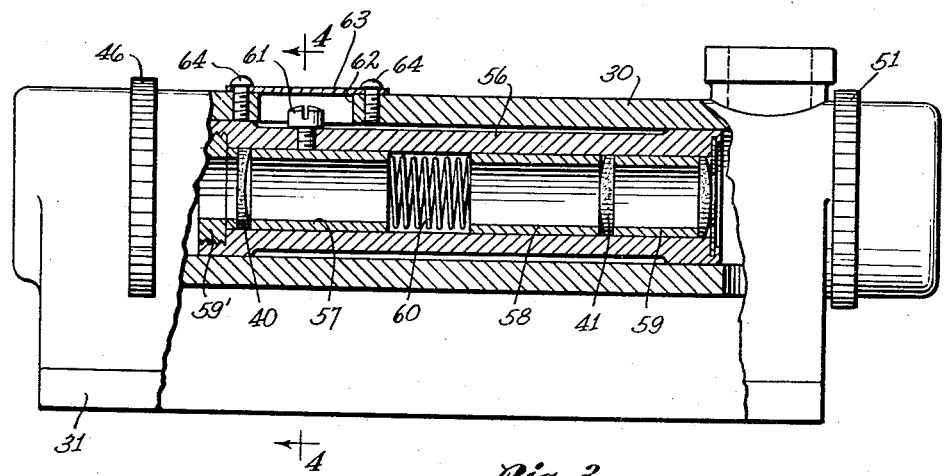

Although the novel features which are believed to be characteristic of this invention will be pointed out with particularity in the claims appending herewith, the invention itself, its objects and advantages, the manner of its organization and the mode of its operation will be better understood by referring to the following description read in conjunction with the accompanying drawings forming a part thereof, in which:

Figure 1 is an elevational view of a printer embodying the invention,

Figure 2 is a cross-sectional view of the optical assembly intermediate the two films, Figure 3 is a partial cross-sectional view taken along the line 3—3 of Fig. 2, Figure 4 is a cross-sectional view taken along the line 4—4 of Fig. 3, Figure 5 is a schematic plan view of the optical system for the printer of Fig. 1, Figure 6 is a plan view of one of the guide roller adjustment assemblies taken along the line 6—6 of Fig. 1, Figure 7 is a similar guide roller adjustment assembly employing a different type of guide roller, Figure 8 is a cross-sectional view of a combination guide roller and adjustment mounting therefor, and Figures 9 and 10 are detailed views of the light beam adjustment means employed in the printer of Fig. 1.

Referring now to the drawings in which the same numerals identify like elements and particularly to Fig. 1, a frame plate 5 serves as a mount for various optical assemblies, guide rollers and sprockets. A supply reel 6 supplies negative film 7 of 35 mm. width, for instance, which is taken from the reel by a sprocket 8, having a double pad roller 9 associated therewith. From the sprocket 8, the film passes around an idler roller 10, over a flanged edge guide roller 11, around a drum 12, over the edge of which the sound track portion of the negative extends, around a wrapping roller 13 to drive sprocket 14 having a double pad roller 15 associated therewith. From the sprocket 15, the film is taken up at 16 by the usual takeup reel.

On the other side of the mounting plate 5 a positive reel 17 supplies a film 18, of 16 mm. width, for instance, to sprocket 19 having a double pad roller 20 associated therewith. From sprocket 19, the film passes around an idler roller 21, around a flanged edge guide roller 22, a drum 23, a wrapping roller 24 to drive sprocket 25 having a double pad roller 26 associated therewith. From the drive sprocket 25, the film is taken up at 27 by the usual takeup reel. The point where the light passes through the negative and is modulated is shown at 28 and the translation point of the positive is shown at 29. The negative film takeup reel and sprockets 8 and 14 are driven by gears through a shaft 116 shown in dotted lines. Similarly shown, is a shaft 117 for driving the takeup reel for the positive film 18 and sprockets 19 and 25. Shafts 116 and 117 are connected to a prime mover by a gear 118 and worm 119. A meter 120 indicates the current supplied to the light source for the printer, while a film counter 121 is employed to indicate negative footage.

Interposed between the modulation point 28 and the translation point 29 is an optical assembly bracket having a tubular portion 30 and an integral flanged mounting base portion 31 which is attachable to base plate 5 by screws 32 and fixed in position on the plate by dowel pins 33 in holes 34. Behind the negative film is positioned the light source 37 (see Fig. 5) in a housing 35. The light source has the usual positioning adjustments therein which, after having been properly made, may be locked in position to the housing which in turn is screwed to the mounting plate 5 and given a fixed position by dowels 36, shown in dotted lines in Fig. 1. Mounted on the housing 35 are the collecting lenses 38, a rhomboid reflector 39 for passing the light beam within the film loop, and an objective lens 40, the lenses and reflector being an assembly which is integral with the housing 35 so that when the housing is fixed to the mounting plate, the assembly is also fixed in position. The optical assembly is for the purpose of projecting a beam of light upon the negative 7 of the proper size, position and focus, the adjustments between the various elements being preset and adjusted before the housing 35 is attached to base plate 5.

Referring now particularly to the intermediate optical assembly shown in Figs. 2 to 5, inclusive, the illustrated unit includes four optical elements such as an objective lens 39, a cylindrical lens 40, a reversing lens 41, a cylindrical lens 42 and an objective lens 43. The lenses 40, 41 and 42 are for the purpose of anamorphosing and reversing the image, the reversal of the image being necessary as both the negative and positive films travel in the same direction with their emulsion sides toward one another.

The objective lens 39 is mounted in a holder having a slidable portion 44 and a threaded portion 45, the portion 45 being threaded within a knurled ring 46, the turning of which adjusts the objective lens 39 along its optical axis. The lens 39 is held in any adjusted position by means of a set screw 47 threaded in the portion 44 through a slot 48 of the tube 30. The head of the screw 47 is carried by a block 55 slidable on the tube 30. At the other end of the tube 30 the objective lens 43 is similarly adjustable by being mounted in a holder having a slidable portion 49 and a threaded portion 50, the latter cooperating with a knurled ring 51. The holder is locked in position by means of a set screw 52 slidable on a block 54 in a slot 53 of the tube 30.

The three cylindrical lenses 40, 41 and 42 are fixedly mounted within a broached cylinder 56 and held in their fixed positions therein by means of spacing cylinders 57, 58 and 59, a compression spring 60 interposed between cylinders 57 and 58, and an exteriorly threaded nut 59'. This unit is adjustable longitudinally as a whole, however, by moving the cylinder 56 by screw 61 threaded therein and slidable within a cut-out portion 62 of the cylindrical holder 30. The screw 61 also functions to aid in the assembly of the cylindrical lenses by holding the spacer 57 in place while lens 40 and nut 59' are being placed and connected. A plate 63 held in position by screws 64 covers the opening 62. Rotational adjustment of the cylinder 56 within tube 30 to vary the azimuth of the cylindrical lenses is obtained by screws 65 and 66 (see Fig. 4). These screws hold the broached cylinder 56 in both longitudinal and rotational positions after adjustment. To prevent marring of the shoulder portion 61' of the cylinder 56 by the ends of screws 65 and 66, two hardened steel spacers 62' and 63' are employed.

The above optical assembly and mount therefor permits adjustment of the five lenses with respect to one another during manufacture, after which no further attention need be given to it. For instance, after the objectives 39 and 43 have been adjusted with respect to each other and with respect to the cylindrical lenses 40, 41 and 42 and the translation points 28 and 29, the adjustments therefor may be sealed. During these adjustments the base 31 is held to the plate 5 by the screws 32, the holes thereof being oversize to provide for slight movement of base 31. When the position of the tube mounting base 31 has been determined, it is then marked with respect to plate 5 and dowel pins 33, and holdes 34 are made to accurately position the assembly on the plate 5. The unit is then removable as a whole for repair and adjustment and may be replaced upon the dowels in its exact former position.

In Fig. 5, an eyepiece 67 positioned at right angles to the optical axis of the optical system and directed at a partially reflecting mirror 68 positioned at an angle of 45° to the optical axis of the system is employed to check the focusing or positioning of the light beam upon the positive film 18. A cap 69 is placed over the opening in the tube after removal of the eyepiece and reflector.

Referring now to Figs. 6 and 7 which are identical except for the type of guide roller employed, the adjustment shown in Fig. 6 is that shown for the positive film 18 in Fig. 1. Upon a tapered boss 70 mounted on the mounting plate 5 is a stud 71 carrying a bracket sleeve 72 with a cut-away portion 73. Surrounding the stud 71 and mounted within the cut-away portion 73 is a compression spring 74, one end of which abuts against the shoulder of the boss 70 and the other end against the shoulder of the cut-away portion 73. The spring, therefore, is always urging the cylinder 72 away from the plate 5. Threadably mounted on the end of stud 71 is a knurled nut 75 having a lock screw 76, rotation of the nut adjusting the sleeve 72 toward and away from the plate 5. The bracket has an extension arm 77 integral with sleeve 72 and parallel with the plate 5 which carries a shaft parallel with stud 71. Upon this shaft in Fig. 6 is a flanged guide roller 78 carrying a synthetic rubber tire 79 at the center thereof. Roller 78 is freely rotatable upon its shaft and is held thereon by a screw-and-washer combination 80. The film is positioned between the flanges of the roller and transverse adjustment thereof may be accomplished during operation of the printer by simply adjusting the nuts 75 on stud 71.

As the mounting brackets 72—77 is rotatable upon stud 71, it may be swung to the right (see Fig. 1) to remove the roller 78 from the drum 23 for threading the machine. In operating position the roller 78 presses the film against the roller 23 with a predetermined pressure determined by the tension of a spring 81 forming part of a toggle and the adjustment of a stop screw 87 having a lock nut 88. The toggle has a rod 82 passing through an aperture in a bracket 83 mounted on a boss 84, the rod 82 being pivoted on the bracket 72—77 at 85. The spring 81 also maintains the roller 78 in open position against a stop pin 86.

A similar adjusting and bracket mounting is shown in Fig. 7 except that the guide roller 78' is of a different type similar to that shown in Fig. 8, and which will now be described by also referring to Fig. 8. The roller is a so-called split roller having two portions 89 and 90 with respective guide flanges at the outer ends thereof. The portion 90 is undercut at 91 to accommodate a compression spring 92 which continually urges the portion 90 toward the portion 89, since the spring 92 has one end thereof abutting the shoulder of cut-away portion 91 and the other end thereof abutting a cylindrical bearing member 93. A set screw 94 maintains the portion 89 in position on the member 93. Both edge guide flanges of such a roller will thus always bear against the film in case of variations in the width of a single film or differences in width between films. To illustrate, film 95 is shown on the guide roller 78' of Fig. 7, the film causing a separation between the two sections 89 and 90 at 96. This separation will vary, of course, with the width of the film, the film being held at all times tightly between the flanges of the roller. Similarly to Fig. 6, rotation of the nut 75 will adjust the film 18 laterally on the roller 23 to correctly position the sound track portion of the film with respect to the light beam.

Referring again to Fig. 1, the guide roller 11 for negative film 7 may be similar to either 78 or 78' of Figs. 6 or 7, while a similar adjusting nut 98 mounted in the same manner as shown in Figs. 6 and 7 is employed. Because of the size of roller 12 and the spatial disposition of associated elements, the extension bracket comprises sections 99 and 100 held in fixed angular relationship by a pin 101. The lateral positioning of the negative film upon the roller 12 so that the light beam passes through the correct portion of the sound track being printed is obtained by rotation of nut 98. A toggle arrangement 102 similar to that shown in Figs. 6 and 7 for roller 22 is provided for roller 11.

Referring again to Fig. 8, the combination roller and adjustment shown therein may be used for either roller 11 or roller 22 when space will permit. Upon the wall 5 a stud 103 is mounted which has an enlarged portion 104 abutting the wall 5. Surrounding the enlarged portion 104 is a compression spring 105 which bears against the wall 5 and also against a collar portion of a bearing sleeve 106, upon which the member 93 rotates. The stud 103 has threaded on the outer end thereof the split nut 75 of Figs. 6 and 7. By rotating the nut 75, the cylindrical member 106 is urged toward the wall 5 against the spring 105, thus axially shifting the roller toward or away from the wall and thereby laterally shifting any film on the roller. A nut 108 is provided at the end of the stud 103 which could also be used for 71 of Figs. 6 and 7 if desired. A rotatable oiler sleeve 107 has a hole therein cooperating with a hole 109 longitudinally of a portion of stud 103 and which is plugged at the other end thereof. A radial hole 110 in stud shaft 103 permits the oil to reach the bearing surfaces.

Thus, after the light source and the intermediate optical system have been fixed in position by the manufacturer of the apparatus, practically the only adjustment required of an operator or user of the apparatus is the lateral adjustment of the films by the rollers 11 and 22, as just described. It occasionally occurs, however, that the sound track on the negative to be printed is out of position caused by being recorded too near the frame lines. In these cases it is desirable to reduce the length of the beam as it impinges upon the negative to prevent the light beam from being modulated by extraneous matter such as the frame lines.

Referring now to Figs. 9 and 10, a simple adjustment for varying the length of the light beam is illustrated in which a member 111, having a handle 112 for the rotation thereof, is positioned in the optical system immediately adjacent a wall of the lighthouse 35. The member 111 has a cylindrical aperture therein, on one side of which is a widened slot 113. The member 111 is maintained tightly in a fixed position in the optical path by a coil spring 114 while the handle 112 is held in a vertical position by spring clip 115. As shown in Figs. 9 and 10, the light beam is given its greatest length when it impinges upon the negative, while rotation of the handle 112 90° decreases the length of the beam to the diameter of the basic circle of the aperture. This adjustment can be readily made by an operator when he is aware of the position of the sound track on the negative.

The above printer construction has been found to be particularly effective from the standpoint of sturdiness, simplicity, and long service without attention. That is, all elements of the optical system may be adjusted relative to one another and to the film surfaces at the factory where the operation thereof and manner of adjustment is familiar. The adjustments required thereafter to accommodate the different positions of the sound tracks are the lateral or traverse adjustments of the films upon the rollers 12 and 23 where the light beams contact the films. These adjustments are simple and can be made during operation of the printer as well as when it is stationary. The only other adjustment required is the narrowing or enlarging of the length of the light beam as it impinges on the negative, such adjustment being provided in a particularly simplified form. This printer is, therefore, especially suitable for reduction printing of sound where comparatively complex optical systems are employed.

The printer can thus be very satisfactorily operated by an unskilled operator. For instance, should the track position of a certain negative be different from a previous one, adjustment of the negative edge guide roller is all that is required to properly center the track in the scanning beam, this adjustment not affecting the position of the image on the positive. If any change in this positive image position is desired, however, adjustment of the positive edge guide roller is all that is required. It is unnecessary, therefore, to make any optical adjustments whatsoever unless the printer has been damaged.

The edge guide rollers and adjustment mounting therefor are being claimed in copending application Serial No. 142,394, filed May 13, 1937.

I claim as my invention:

1. A continuous film printer comprising a vertical mounting plate, means mounted on one side of said plate for advancing a negative film in a vertical direction, a film-pulled roller, said film overhanging an edge thereof, a unitary light source and optical system for directing light of predetermined dimensions on the overhanging portion of said negative, said light source and said optical system being doweled to said mounting plate to prevent adjustment thereof, means for advancing a positive film in a vertical direction on another portion of said mounting plate, a unitary optical system intermediate said negative and positive films to direct a beam of light therebetween of predetermined dimensions, said unitary optical system bearing a permanent relationship to said first-mentioned optical system by being doweled to said mounting plate to prevent adjustment thereof and all of said elements being fixedly positioned on said plate with respect to one another, manually operable means for laterally positioning said negative with respect to said light beam, and manually operable means for laterally positioning said positive with respect to said light beam, said manually operable means being operable during operation of said printer.

2. A continuous film printer in accordance with claim 1 in which said first-mentioned optical assembly system includes manually operable means for varying the dimensions of the light beam directed to said negative.

3. A continuous film printer in accordance with claim 1 in which said laterally adjusting means comprises double-flanged rollers mounted on respective accessible brackets manually adjustable for positioning said roller.

4. A motion picture printer comprising a mounting plate, means for projecting upon a negative film a beam of light of predetermined dimensions, means for transmitting light emerging from said negative film to a positive film in predetermined dimensions, means for positioning the surfaces of said negative and positive films, means individual to each of said films for transversely positioning said films with respect to said light, all of said above-mentioned means being mounted on said mounting plate, and means for attaching said light transmitting means to said mounting plate to initially set said light transmitting means in a predetermined relationship with respect to said surface positioning means and to accurately reset said light transmission means to said predetermined relationship when said light transmission means is removed from said mounting plate.

5. A printing apparatus comprising means for passing a negative film past a beam of light, means spatially disposed from said negative film for passing a positive film past said beam of light after emerging from said negative, means individual to each of said films for fixedly positioning each respective surface of said films with respect to each other and with respect to said light beams, means individual to each of said films for laterally adjusting respective films with respect to said light beams, an optical assembly interposed between said film surface positioning means, a mounting plate, all of said above-mentioned elements and means being attached to said mounting plate, said optical assembly comprising a base plate attached to said mounting plate, and means for connecting said base plate and said mounting plate to initially set said optical assembly in a predetermined relationship with respect to said film surface positioning means and to accurately reset said optical assembly to said relationship after removal of said base plate from said mounting plate.

6. A printing apparatus comprising means for passing a negative film past a beam of light, means spatially disposed from said negative film for passing a positive film past said beam of light after emerging from said negative, means individual to each of said films for fixedly positioning each respective surface of said films with respect to each other and with respect to said light beams, means individual to each of said films for laterally adjusting respective films with respect to said light beams, an optical assembly interposed between said film surface positioning means, and a mounting plate, all of said above-mentioned elements and means being attached to said mounting plate, said optical assembly comprising a base plate attached to said mounting plate to prevent adjustment thereof with respect to said mounting plate and with respect to said film surface positioning means, said optical assembly being accurately pre-adjusted and doweled to said mounting plate to prevent adjustment thereof.

7. A film printer comprising means for fixedly positioning the surface of a negative film, means for fixedly positioning the surface of a positive film, a unitary light source and optical system for projecting a beam of light on said negative, an optical assembly interposed between said film surface positioning means for projecting light emerging from said negative to said positive, lateral guide means individual to each of said films, a common mounting plate for all of said above-mentioned elements, and similar means for connecting said light source, optical system and optical assembly to said mounting plate for initially setting said light source, optical system and optical assembly in a predetermined relationship with respect to said surface positioning means and for resetting said light source, optical system and optical assembly to said relationship after removal of said light source, optical system or optical assembly from said mounting plate.

8. A film printer comprising means for fixedly positioning the surface of a negative film, means for fixedly positioning the surface of a positive film, a unitary light source and optical system for projecting a beam of light on said negative, an optical assembly interposed between said film surface positioning means for projecting light emerging from said negative to said positive, lateral guide means individual to each of said films, and a common mounting plate for all of said above-mentioned elements, said surface positioning means being fixed to said mounting plate, said light source and optical system being semi-permanently attached to said mounting plate to prevent adjustment thereof, and said optical assembly being semi-permanently attached to said mounting plate to prevent adjustment thereof, and said individual transverse film guiding means being adjustable with respect to said light beams and surface positioning means, said unitary light source and optical system and said optical assembly being doweled to said mounting plate.

MILFORD E. COLLINS.